United States Patent [19]

Iwata

[11] Patent Number: 4,523,567
[45] Date of Patent: Jun. 18, 1985

[54] IGNITION TIMING CONTROL SYSTEM FOR INTERNAL-COMBUSTION ENGINE

[75] Inventor: Toshio Iwata, Hyogo, Japan

[73] Assignee: Mitsubishi Denki Kabushiki Kaisha, Tokyo, Japan

[21] Appl. No.: 494,289

[22] Filed: May 13, 1983

[30] Foreign Application Priority Data

May 14, 1982 [JP] Japan .................................. 57-82597

[51] Int. Cl.³ .............................................. F02P 5/04
[52] U.S. Cl. ........................................ 123/425; 73/35
[58] Field of Search ............................ 123/425; 73/35

[56] References Cited

U.S. PATENT DOCUMENTS

| | | | |
|---|---|---|---|
| 4,111,035 | 9/1978 | West et al. | 123/425 X |
| 4,346,586 | 8/1982 | Furrey | 123/425 X |
| 4,364,353 | 12/1982 | Fiala | 123/425 |
| 4,368,635 | 1/1983 | Yoshida | 73/35 |
| 4,370,963 | 2/1983 | Iwata et al. | 123/425 |
| 4,422,422 | 12/1983 | Mowery et al. | 123/425 |
| 4,429,565 | 2/1984 | Utsumi et al. | 73/35 |

Primary Examiner—Tony M. Argenbright
Attorney, Agent, or Firm—Bernard, Rothwell & Brown

[57] ABSTRACT

An ignition timing control system for suppressing the knocking of an internal-combustion engine by delaying the ignition timing in proportion to the magnitude of the knocking, which includes a phase delay limiter for limiting a controlled phase delay below a predetermined value when the magnitude of knocking exceeds a preset value.

3 Claims, 6 Drawing Figures

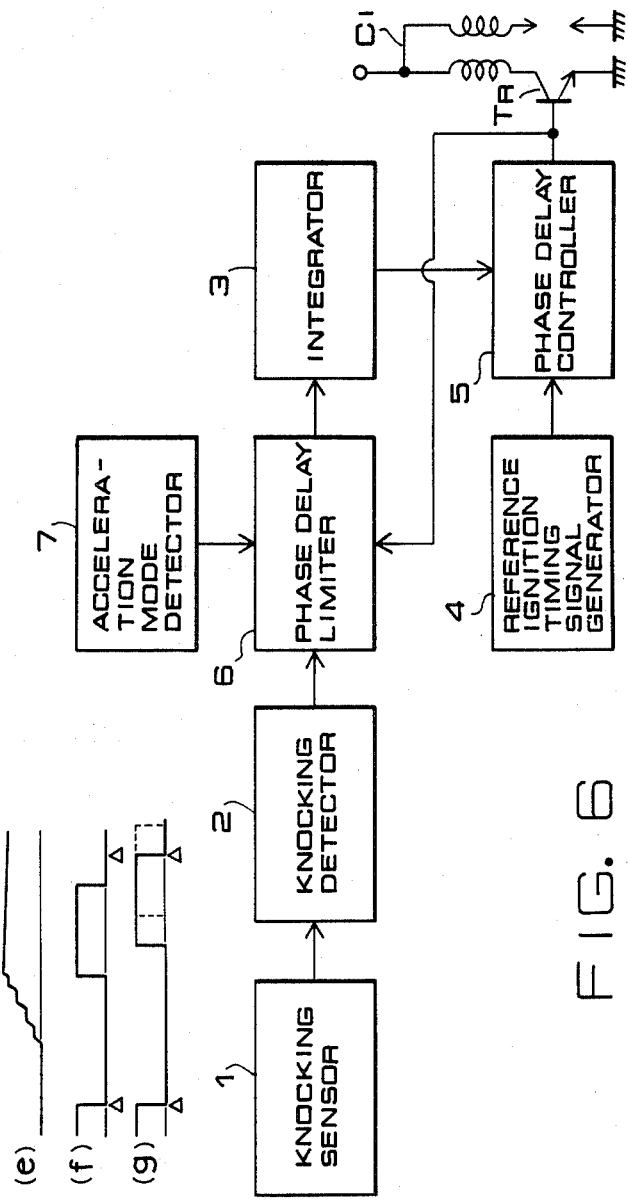

IGNITION TIMING CONTROL SYSTEM FOR INTERNAL-COMBUSTION ENGINE

BACKGROUND OF THE INVENTION

1. Field of the Invention

The present invention relates to an ignition timing control system for an internal-combustion engine, for controlling the ignition timing in proportion to the magnitude of knocking of the internal-combustion engine.

2. Description of the Prior Art

A known ignition timing control system for suppressing the generation of knocking in an internal-combustion engine detects a signal which is specific to knocking by sensing the vibration of the engine or the internal pressure of the cylinders and delays the ignition timing on the basis of the detected signal.

Generally, when knocking occurs, a high-frequency vibration of several kilohertz is generated in the internal-combustion engine. This high-frequency vibration overlaps with the vibration of the engine and the pressure variation within the combustion chamber. Accordingly, a knocking signal can be obtained by converting the detected vibration of the engine and the pressure variation within the combustion chamber into an electric signal and then discriminating the specific high-frequency component corresponding to the knocking by means of a frequency filter or the like.

First a conventional ignition timing control system for an internal-combustion engine will be described in connection with FIGS. 1 and 2.

Referring to FIG. 1 showing a block diagram of a conventional ignition timing control system, the ignition timing control system comprises a knocking sensor 1 for detecting vibration and or variations in pressure within the cylinder resulting from the generation of knocking in the internal-combustion engine and for converting the detected signal into an electric signal, a knocking detector 2 for discriminating a specific knocking signal component by processing the output signal provided by the knocking sensor 1 through an internal frequency filter and an internal comparator of a predetermined threshold level and for providing a knocking detection signal, an integrator 3 for raising the output voltage level by integrating the pulses of the knocking detection signal over a predetermined time constant and for lowering the output voltage level over a predetermined time constant when no knocking detection signal is applied thereto, a reference ignition timing signal generator 4 for generating a predetermined reference ignition timing signal corresponding to the revolving speed and the load conditions of the engine, a phase delay controller 5 for delaying the phase of the reference ignition timing signal in proportion to the output voltage level of the integrator 3 and a transistor $T_R$ for interrupting current supply to an ignition coil $C_I$ in synchronism with the output signal of the phase delay controller 5.

The conventional ignition timing control system as described above operates in the following manner.

Referring to FIG. 2, when knocking occurs in the internal-combustion engine, the knocking sensor 1 provides a knocking signal as shown in FIG. 2-(a). When knocking is generated, an oscillatory wave form of an amplitude far greater than that of the oscillatory waveform of the noise component is provided. The magnitude of knocking is represented by the magnitude of the amplitude of the oscillatory waveform, namely, weak knocking by the waveform in the section A of FIG. 2, while strong knocking by the waveform in the section B of FIG. 2. Upon the reception of the knocking signal, the knocking detector 2 compares the waveform of the knocking signal with a predetermined threshold level, which is greater than the noise component as shown in FIG. 2-(b), by means of the internal comparator to discriminate a specific knocking signal included in the knocking signal and then provides a knock detection signal of a pulse train as indicated in FIG. 2-(c). Upon the reception of the knocking detection signal, the integrator 3 integrates pulse train. That is, the integrator 3 integrates the pulse train of the knocking detection signal over a predetermined time constant to raise the output voltage level and when no knocking detection signal is applied thereto, the integrator 3 lowers the output voltage level over a predetermined time constant. The integral of the pulse widths of the knocking detection signal thus obtained correlates strongly with the magnitude of the knocking as in FIG. 2-(d). On the other hand, the reference ignition timing signal generator 4 generates a reference ignition timing signal corresponding to the revolving speed and the load conditions of the engine. Upon the reception of the reference ignition timing signal, the phase delay controller 5 delays the phase of ignition timing in proportion to the integral of the pulse train of the knocking detection signal provided by the integrator 3 to control the phase of ignition timing in proportion to the magnitude of the knocking. The output pulse of the phase delay controller 5 is applied to the base of the transistor $T_R$. Then, the rising and the breaking of the pulse are used for switching on and switching off the transistor $T_R$, whereby current supply to the ignition coil $C_I$ is interrupted intermittently. When current supply is interrupted the engine is ignited.

Incidentally, the condition of knocking varies depending not only on comparatively stable conditions such as the temperature and the humidity of the suction air, the air fuel ratio and ignition timing, but also on various conditions which change subtly every combustion, such as the internal condition of the combustion chamber and flaming speed, therefore, knocking phenomena of the same mode do not necessarily occur every combustion even if the engine is in a stabilized steady state operating condition. Accordingly, it is possible that comparatively strong knocks occur suddenly or occasionally even during the steady state operation of the engine. When strong knocks occur suddenly or occasionally, according to a phase control method in which the phase of ignition timing is delayed in proportion to the magnitude of knocking, the phase of ignition timing is temporarily delayed excessively for a single strong knock, which possibly affect the output of the engine and the exhaust temperature unfavorably. Accordingly, such a problem can be solved if the controlled phase delay for coping with above-mentioned occasional strong knocks can be restricted within a range which will not affect unfavorably the operation of the engine, when a strong knock occurs.

SUMMARY OF THE INVENTION

Accordingly, it is an object of the present invention to provide an ignition timing control system capable of preventing improper operation resultng from excessive phase delay by restricting the controlled phase delay when a strong knocking occurs.

The ignition timing control system of the present invention is provided with a phase delay limiter which receives a knocking detection signal from a knocking detector. The phase delay limiter compares the integral of the pulses of the knocking detection signal with a predetermined set value within every interval between successive ignitions and sends the knocking detection signal just as it is to a phase delay controller when the integral of the pulses is smaller than the set value. When the integral of the pulses reach the set value, the phase delay limiter interrupts the knocking detection signal. The phase delay limiter repeats such control operation every interval between successive ignitions. Thus the ignition timing control system of the present invention overcomes the disadvantage of the conventional ignition timing control system that an excessive phase delay is caused by the occurrence of a temporary strong knock.

BRIEF DESCRIPTION OF THE DRAWINGS

FIGS. 4 and 5 are waveform charts of signals provided by the components of the ignition timing control system of FIG. 3; and FIG. 6 is a block diagram of a second embodiment of an ignition timing control system according to the present invention.

DETAILED DESCRIPTION OF THE PREFERRED EMBODIMENTS

Figure 1:
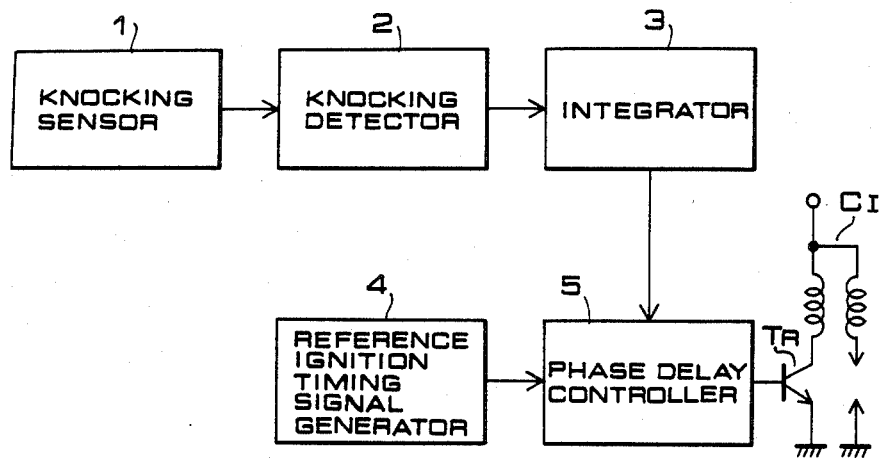
FIG. 1 is a block diagram of a conventional ignition timing control system for an internal-combustion engine.
Figure 2:
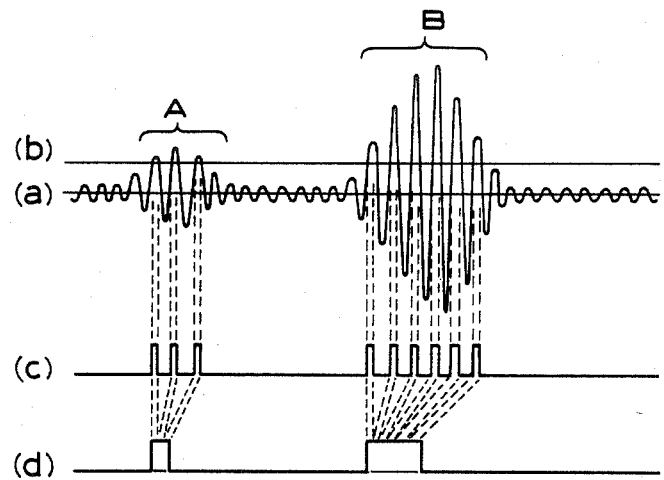
FIG. 2 is a waveform chart of the signals provided by the components of the ignition timing control system of FIG. 1.
Figure 3:
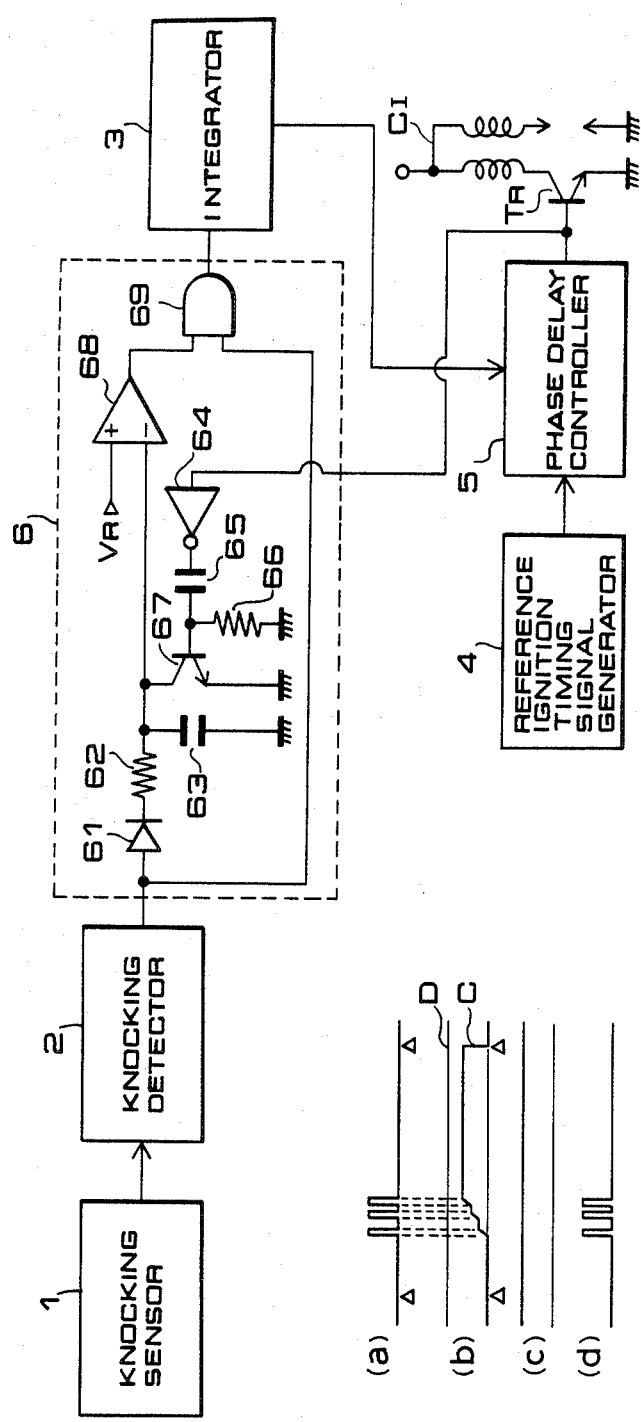
FIG. 3 is a block diagram of a first embodiment of an ignition timing control system according to the present invention.

Referring to FIG. 3, a knocking sensor 1 and a knocking detector 2 are the same as those employed in the conventional ignition timing control system as shown in FIG. 1. The knocking detector 2 provides a knocking detection signal.

A phase delay limiter 6, which receives the knocking detection signal, comprises a diode 61, a resistance 62, a capacitor 63, an inverter 64, a capacitor 65, a resistance 66, a transistor 67, a comparator 68 and an AND gate 69. The diode 61 and the resistance 62 are interconnected in series. The anode of the diode 61 and one end of the resistance 62 are connected to the output terminal of the knocking detector 2 and one end of the capacitor 63 respectively. The collector and the emitter of the transistor 67 are connected to one end of the capacitor 63 and the other end of the capacitor 63 respectively. When the transistor 67 is switched on, the electric charge of the capacitor 63 is discharged through the transistor 67. The transistor is driven by a signal sent thereto from the phase delay controller 5 through a differentiation circuit consisting of the inverter 64, the capacitor 65 and the resistance 66. One of the two input terminals of the comparator 68 is connected to the junction of the capacitor 63 and the resistance 62, while the other input terminal thereof is connected to a DC power source, not shown, which generates a predetermined reference voltage $V_R$. One of the input terminals of the AND gate 69 and the other input terminal of same are connected to the output terminal of the comparator 68 and to the anode of the diode 61, namely, the output terminal of the knocking detector 2, respectively. The output terminal of the AND gate 69 is connected to the input terminal of the integrator 3.

The phase delay controller 5 uses the output of the integrator 3 for delaying the phase of the output of the reference ignition timing signal generator 4. The transistor $T_R$, which interrupts current supply to the ignition coil $C_I$ intermittently, is controlled according to the output of the phase delay controller 5, which is analogous with the control mode of the conventional ignition timing control system as shown in FIG. 1.

The manner of ignition timing control operation of the ignition timing control system of FIG. 3 will described hereinafter.

Figure 4:
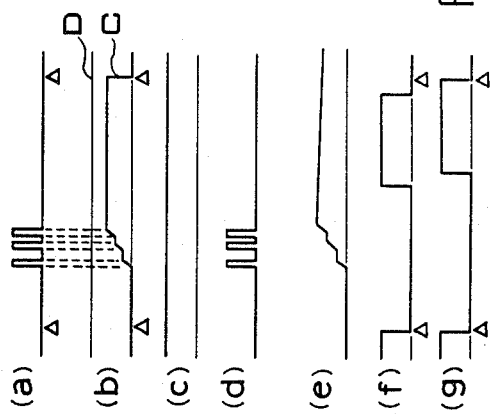

When knocking occurs in the engine, the knocking detector 2 provides a knocking detection signal in the form of a pulse train as shown in FIG. 4-(a). The pulse train is applied to the phase delay limiter 6 of FIG. 3 to charge the capacitor 63 through the diode 61 and the resistance 62. The charging voltage of the capacitor 63 rises as indicated at C in FIG. 4-(b). While the charging voltage is below a predetermined reference voltage $V_R$ indicated at D in FIG. 4-(b), the output level of the comparator 68 remains at a high level as shown in FIG. 4-(c) and the AND gate 69 provides an output signal as shown in FIG. 4-(d), which is identical with the knocking detection signal of the form of a pulse train. The integrator 3 integrates the output signal of the AND gate as shown in FIG. 4-(e). The phase delay controller 5 delays the phase of the reference ignition timing signal as shown in FIG. 4-(f) according to the output voltage of the integrator 3 as shown in FIG.4-(e) to provide a pulse signal as shown in FIG. 4-(g). The transistor $T_R$ of FIG. 1 is switched off by using the falling of the pulse signal to interrupt current supply to the ignition coil $C_I$, whereby the engine is ignited. The ignition timing is indicated by a symbol "Δ" in FIG. 4.

At the falling of the pulse as shown in FIG. 4-(g), namely, at the ignition timing, the transistor 67 of FIG. 3 is switched on to reset the charging voltage of the capacitor 63 to zero level as indicated at C in FIG. 4-(b).

FIG. 5 shows the respective waveforms of signals generated by the component of the ignition timing control system of FIG. 3, upon occurrence of a comparatively strong knocking.

When a knocking detection signal of the form of a pulse train having a plurality of pulses as shown in FIG. 5-(a) is generated due to the occurrence of a strong knocking, the charging voltage indicated at C rises to exceed the predetermined reference voltage $V_R$ as shown in FIG. 5-(b), and thereby the output of the comparator 68 is inverted into low level as shown in FIG. 5-(c). Consequently, the AND gate 69 provides, as shown in FIG. 5-(d), only the pulses of the knocking detection signal which have been generated before the comparator 69 is inverted into low level. These limited number of pulses are applied to the integrator 3. When the phase delay limiter 6 is not provided, since the pulse train of FIG. 5-(a) is applied as it is to the integrator 3, the output voltage of the integrator 3 rises greatly as indicated by broken line in FIG. 5-(e), therefore, the phase of the output signal of the phase delay controller 5 is delayed greatly as indicated by broken line in FIG. 5-(g) causing the excessive delay of ignition timing. When the phase delay limiter 6 is provided, only those limited number of pulses shown by continuous line in FIG. 5-(d) are applied to the integrator 3 and hence the rise of the output voltage of the integrator 3 is limited to a predetermined upper limit. Consequently, the excessive delay of ignition timing is avoided when a comparatively strong knocking occurs.

In the first embodiment of the present invention as described hereinbefore, the phase delay limiting level of the phase delay limiter 6 is determined through setting the level of the reference voltage $V_R$. The level of the reference voltage $V_R$ need be selectively determined so that the system can respond appropriately to knocking during acceleration and at the same time so that the system will not affect the operation of the engine unfavorably when sudden and comparatively strong knocking occurs during steady state operation of the engine. That is, the reference voltage D need be determined so as to meet the requirements for the appropriate responsiveness-to-knocking of the control system as well as for the smooth operation of the engine.

In some internal-combustion engine, sometimes, those requirements are incapable of being met at the same time. Referring to FIG. 6, a second embodiment of the present invention is provided with an acceleration sensor 7, such as a throttle position sensor. The acceleration sensor 7 is connected to the phase delay limiter 6. The acceleration sensor 7 detects the acceleration mode of the engine and provides a detection signal. The detection signal provided by the acceleration sensor 7 is used for changing the reference voltage $V_R$ into a value which will meet the responsiveness of the control system to the acceleration mode, so that the ignition timing control system of the present invention is allowed to operate without deteriorating the responsiveness during the acceleration mode.

As described hereinbefore, the ignition timing control system according to the present invention is capable of appropriately controlling the ignition timing of an internal-combustion engine without unfavorably affecting the performance of the internal-combustion engine by limiting ignition timing delaying degree to prevent excessive ignition timing delaying even when a comparatively strong knocking occurs during the steady state operation of the internal-combustion engine and also capable of changing the limit of ignition timing delay on the basis of a signal provided by a sensor provided for detecting the accelerating mode of the internal combustion engine when the limit of ignition timing delay need be changed to improve the responsiveness of the control system during the acceleration mode, whereby both the responsiveness of the ignition timing control system and the performance of the internal-combustion engine are optimized at the same time.

What is claimed is:

1. An ignition timing control system for an internal-combustion engine, comprising a knocking detector capable of providing a knocking detection signal having pulses proportional to the magnitude of the knocking of the internal-combustion engine; a phase delay limiter which integrates the pulses of said knocking detection signal in every ignition period to produce said knocking detection signal at the output terminal thereof when the integral of said knocking detection signal is smaller than a predetermined set value or to interrupt said knocking detection signal when said integral reaches said set value; an integrator which integrates the pulses of said knocking detection signal produced at the output terminal of the phase delay limiter; means to generate a reference ignition timing signal; and a phase delay controller for delaying the phase of said reference ignition timing signal in proportion to the output of the integrator.

2. An ignition timing control system for an internal-combustion engine according to claim 1, wherein said phase delay limiter comprises a capacitor capable of being charged with the pulses of said knocking detection signal; a comparator which compares the terminal voltage of the capacitor with a predetermined reference voltage and provides an output signal only while the former is smaller than the latter; an AND gate which allows said knocking detection signal to be applied to said integrator only while the output signal of the comparator is applied thereto; and a switching element forming a discharge circuit which discharges the electric charge of said capacitor at the trailing edge of the output signal of said phase delay controller.

3. An ignition timing control system for an internal-combustion engine according to claim 2, wherein said reference voltage is capable of being changed by means to detect the acceleration mode of the internal-combustion engine.

* * * * *